US012615130B2

(12) United States Patent
Laufer et al.

(10) Patent No.: US 12,615,130 B2
(45) Date of Patent: Apr. 28, 2026

(54) ENVIRONMENTAL-BASED PARAMETERS OPTIMIZATION OF CLOCK

(71) Applicant: Mellanox Technologies, Ltd., Yokneam (IL)

(72) Inventors: Nir Laufer, Zoran (IL); Dotan David Levi, Kiryat Motzkin (IL); Bar Shapira, Tel Aviv (IL); Natan Manevich, Nesher (IL); Dror Porat, Haifa (IL); Gil Shabat, Hod Hasharon (IL)

(73) Assignee: Mellanox Technologies, Ltd, Yokneam (IL)

( * ) Notice: Subject to any disclaimer, the term of this patent is extended or adjusted under 35 U.S.C. 154(b) by 13 days.

(21) Appl. No.: 18/624,169

(22) Filed: Apr. 2, 2024

(65) Prior Publication Data

US 2025/0310074 A1 Oct. 2, 2025

(51) Int. Cl.
 *G06F 1/12* (2006.01)
 *G06F 1/08* (2006.01)
 *H04L 7/00* (2006.01)

(52) U.S. Cl.
 CPC .............. *H04L 7/0016* (2013.01); *G06F 1/08* (2013.01); *G06F 1/12* (2013.01)

(58) Field of Classification Search
 CPC ...................................... G06F 1/10; G06F 1/12
 See application file for complete search history.

(56) References Cited

U.S. PATENT DOCUMENTS

| | | | |
|---|---|---|---|
| 5,392,421 A | 2/1995 | Lennartsson | |
| 5,402,394 A | 3/1995 | Turski | |
| 5,416,808 A | 5/1995 | Witsaman et al. | |
| 5,491,792 A | 2/1996 | Grisham et al. | |

(Continued)

FOREIGN PATENT DOCUMENTS

| | | |
|---|---|---|
| CN | 106817183 A | 6/2017 |
| CN | 108829493 A | 11/2018 |

(Continued)

OTHER PUBLICATIONS

IEEE Standard 1588 TM-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.

(Continued)

*Primary Examiner* — Phil K Nguyen
(74) *Attorney, Agent, or Firm* — Meitar Patents Ltd.; Daniel Kligler

(57) ABSTRACT

In one embodiment, a device includes clock circuitry including an oscillator to generate a local clock signal having a clock frequency, and a hardware clock to maintain a local clock responsively to the clock signal, at least one sensor to measure at least one value of at least one environmental parameter, processing circuitry to find at least one value of at least one filter parameter based on the at least one value of the at least one environmental parameter, and a filter to receive an error signal between a remote clock and the local clock, and filter the error signal and generate an adjustment to cause the clock circuitry to adjust the local clock signal or the local clock based on the at least one value of the at least one filter parameter.

21 Claims, 2 Drawing Sheets

(56) References Cited

U.S. PATENT DOCUMENTS

| | | | |
|---|---|---|---|
| 5,564,285 A | 10/1996 | Jurewicz et al. | |
| 5,592,486 A | 1/1997 | Lo et al. | |
| 5,864,315 A * | 1/1999 | Welles, II | G01S 19/34 |
| | | | 342/357.62 |
| 5,896,524 A | 4/1999 | Halstead, Jr. et al. | |
| 6,055,246 A | 4/2000 | Jones | |
| 6,081,143 A | 6/2000 | Ho et al. | |
| 6,084,856 A | 7/2000 | Simmons et al. | |
| 6,144,714 A | 11/2000 | Bleiweiss et al. | |
| 6,199,169 B1 | 3/2001 | Voth | |
| 6,289,023 B1 | 9/2001 | Dowling et al. | |
| 6,339,833 B1 * | 1/2002 | Guo | H04J 3/0688 |
| | | | 327/20 |
| 6,449,291 B1 | 9/2002 | Burns et al. | |
| 6,535,926 B1 | 3/2003 | Esker | |
| 6,556,636 B1 | 4/2003 | Takagi | |
| 6,556,638 B1 | 4/2003 | Blackburn | |
| 6,718,476 B1 | 4/2004 | Shima | |
| 6,918,049 B2 | 7/2005 | Lamb et al. | |
| 7,111,184 B2 | 9/2006 | Thomas, Jr. et al. | |
| 7,191,354 B2 | 3/2007 | Purho | |
| 7,245,627 B2 | 7/2007 | Goldenberg et al. | |
| 7,254,646 B2 | 8/2007 | Aguilera et al. | |
| 7,334,124 B2 | 2/2008 | Pham et al. | |
| 7,412,475 B1 | 8/2008 | Govindarajalu | |
| 7,440,474 B1 | 10/2008 | Goldman et al. | |
| 7,447,975 B2 | 11/2008 | Riley | |
| 7,483,448 B2 | 1/2009 | Bhandari et al. | |
| 7,496,686 B2 | 2/2009 | Coyle | |
| 7,535,933 B2 | 5/2009 | Zerbe et al. | |
| 7,623,552 B2 | 11/2009 | Jordan et al. | |
| 7,636,767 B2 | 12/2009 | Lev-Ran et al. | |
| 7,650,158 B2 | 1/2010 | Indirabhai | |
| 7,656,751 B2 | 2/2010 | Rischar et al. | |
| 7,750,685 B1 | 7/2010 | Bunch et al. | |
| 7,904,713 B1 | 3/2011 | Zajkowski et al. | |
| 7,941,684 B2 | 5/2011 | Serebrin et al. | |
| 8,065,052 B2 | 11/2011 | Fredriksson et al. | |
| 8,072,313 B2 | 12/2011 | Drucker | |
| 8,300,749 B2 | 10/2012 | Hadzic et al. | |
| 8,341,454 B1 | 12/2012 | Kondapalli | |
| 8,370,675 B2 | 2/2013 | Kagan | |
| 8,407,478 B2 | 3/2013 | Kagan et al. | |
| 8,607,086 B2 | 12/2013 | Cullimore | |
| 8,693,506 B2 | 4/2014 | Hadzic | |
| 8,699,406 B1 | 4/2014 | Charles et al. | |
| 8,824,903 B2 | 9/2014 | Christensen | |
| 8,879,552 B2 | 11/2014 | Zheng | |
| 8,930,647 B1 | 1/2015 | Smith | |
| 9,344,265 B2 | 5/2016 | Karnes | |
| 9,397,960 B2 | 7/2016 | Arad et al. | |
| 9,549,234 B1 | 1/2017 | Mascitto | |
| 9,753,854 B1 | 9/2017 | Bao | |
| 9,942,025 B2 | 4/2018 | Bosch et al. | |
| 9,979,998 B1 | 5/2018 | Pogue et al. | |
| 10,014,937 B1 | 7/2018 | Di Mola et al. | |
| 10,027,601 B2 | 7/2018 | Narkis et al. | |
| 10,054,977 B2 | 8/2018 | Mikhaylov et al. | |
| 10,095,543 B1 | 10/2018 | Griffin et al. | |
| 10,122,527 B1 | 11/2018 | Fischer | |
| 10,148,258 B2 | 12/2018 | Carlson et al. | |
| 10,164,759 B1 | 12/2018 | Volpe | |
| 10,320,646 B2 | 6/2019 | Mirsky et al. | |
| 10,515,045 B1 | 12/2019 | Mattina | |
| 10,637,776 B2 | 4/2020 | Iwasaki | |
| 10,727,966 B1 | 7/2020 | Izenberg et al. | |
| 10,778,361 B1 | 9/2020 | Almog et al. | |
| 10,778,406 B2 | 9/2020 | Gaist et al. | |
| 10,785,015 B1 | 9/2020 | Rada | |
| 10,841,243 B2 | 11/2020 | Levi et al. | |
| 10,879,910 B1 | 12/2020 | Franck et al. | |
| 10,887,077 B1 | 1/2021 | Ivry | |
| 10,908,635 B1 | 2/2021 | Ranganathan et al. | |
| 11,070,224 B1 | 7/2021 | Faig et al. | |
| 11,070,304 B1 | 7/2021 | Levi et al. | |
| 11,128,500 B1 | 9/2021 | Mentovich et al. | |
| 11,157,433 B2 | 10/2021 | Lederman et al. | |
| 11,240,079 B1 | 2/2022 | Kushnir et al. | |
| 11,303,363 B1 | 4/2022 | Mohr et al. | |
| 11,336,383 B2 | 5/2022 | Mula et al. | |
| 11,368,768 B2 | 6/2022 | Bakopoulos et al. | |
| 11,379,334 B1 | 7/2022 | Srinivasan et al. | |
| 11,388,263 B2 | 7/2022 | Levi et al. | |
| 11,476,928 B2 | 10/2022 | Levi et al. | |
| 11,606,157 B1 | 3/2023 | Wasko et al. | |
| 11,706,014 B1 | 7/2023 | Manevich et al. | |
| 11,835,999 B2 | 12/2023 | Shapira et al. | |
| 11,917,045 B2 | 2/2024 | Levi et al. | |
| 12,028,155 B2 | 7/2024 | Shapira et al. | |
| 2001/0006500 A1 | 7/2001 | Nakajima et al. | |
| 2002/0027886 A1 | 3/2002 | Fischer et al. | |
| 2002/0031199 A1 | 3/2002 | Rolston et al. | |
| 2003/0083814 A1 * | 5/2003 | Gronemeyer | G06F 1/3203 |
| | | | 701/478 |
| 2004/0096013 A1 | 5/2004 | Laturell et al. | |
| 2004/0153907 A1 | 8/2004 | Gibart | |
| 2005/0033947 A1 | 2/2005 | Morris et al. | |
| 2005/0100054 A1 | 5/2005 | Scott et al. | |
| 2005/0172181 A1 | 8/2005 | Huliehel | |
| 2005/0265500 A1 * | 12/2005 | Miao | H04J 3/0632 |
| | | | 375/354 |
| 2005/0268183 A1 | 12/2005 | Barmettler | |
| 2005/0281367 A1 * | 12/2005 | Lesso | H03L 7/197 |
| | | | 375/376 |
| 2006/0109376 A1 | 5/2006 | Chaffee et al. | |
| 2006/0171496 A1 | 8/2006 | Nakamuta et al. | |
| 2007/0008044 A1 | 1/2007 | Shimamoto | |
| 2007/0072451 A1 | 3/2007 | Tazawa et al. | |
| 2007/0104098 A1 | 5/2007 | Kimura et al. | |
| 2007/0124415 A1 | 5/2007 | Lev-Ran et al. | |
| 2007/0139085 A1 | 6/2007 | Elliot et al. | |
| 2007/0159924 A1 | 7/2007 | Vook et al. | |
| 2007/0266119 A1 | 11/2007 | Ohly | |
| 2008/0069150 A1 | 3/2008 | Badt et al. | |
| 2008/0225841 A1 | 9/2008 | Conway et al. | |
| 2008/0285597 A1 | 11/2008 | Downey et al. | |
| 2009/0167443 A1 | 7/2009 | Liu et al. | |
| 2009/0257458 A1 | 10/2009 | Cui et al. | |
| 2010/0017139 A1 * | 1/2010 | Adams | G01V 1/22 |
| | | | 702/14 |
| 2010/0280858 A1 | 11/2010 | Bugenhagen | |
| 2011/0182191 A1 | 7/2011 | Jackson | |
| 2011/0194425 A1 | 8/2011 | Li et al. | |
| 2012/0063556 A1 | 3/2012 | Hoang | |
| 2012/0076319 A1 | 3/2012 | Terwal | |
| 2012/0301134 A1 | 11/2012 | Davari et al. | |
| 2013/0039359 A1 | 2/2013 | Bedrosian | |
| 2013/0045014 A1 | 2/2013 | Mottahedin et al. | |
| 2013/0215889 A1 | 8/2013 | Zheng et al. | |
| 2013/0235889 A1 | 9/2013 | Aweya et al. | |
| 2013/0294144 A1 | 11/2013 | Wang et al. | |
| 2013/0315265 A1 | 11/2013 | Webb, III et al. | |
| 2013/0336435 A1 | 12/2013 | Akkihal et al. | |
| 2014/0085141 A1 | 3/2014 | Geva et al. | |
| 2014/0153680 A1 | 6/2014 | Garg et al. | |
| 2014/0185216 A1 | 7/2014 | Zeng et al. | |
| 2014/0185632 A1 | 7/2014 | Steiner et al. | |
| 2014/0210524 A1 * | 7/2014 | Roberts | A61N 1/372 |
| | | | 327/144 |
| 2014/0253387 A1 | 9/2014 | Gunn et al. | |
| 2014/0281036 A1 | 9/2014 | Cutler et al. | |
| 2014/0301221 A1 | 10/2014 | Nadeau et al. | |
| 2014/0321285 A1 | 10/2014 | Chew et al. | |
| 2015/0019839 A1 | 1/2015 | Cardinell et al. | |
| 2015/0078405 A1 | 3/2015 | Roberts | |
| 2015/0092793 A1 | 4/2015 | Aweya | |
| 2015/0127978 A1 | 5/2015 | Cui et al. | |
| 2015/0131766 A1 | 5/2015 | Chen et al. | |
| 2015/0163050 A1 | 6/2015 | Han et al. | |
| 2015/0318941 A1 | 11/2015 | Zheng et al. | |
| 2015/0372681 A1 * | 12/2015 | Melanson | H03L 1/028 |
| | | | 331/1 R |
| 2016/0057518 A1 | 2/2016 | Neudorf | |
| 2016/0072602 A1 | 3/2016 | Earl et al. | |

(56) References Cited

U.S. PATENT DOCUMENTS

| 2016/0110211 A1 | 4/2016 | Karnes |
| 2016/0140066 A1 | 5/2016 | Worrell et al. |
| 2016/0277138 A1 | 9/2016 | Garg et al. |
| 2016/0285574 A1 | 9/2016 | White et al. |
| 2016/0315756 A1 | 10/2016 | Tenea et al. |
| 2017/0005903 A1 | 1/2017 | Mirsky |
| 2017/0017604 A1 | 1/2017 | Chen et al. |
| 2017/0126589 A1 | 5/2017 | Estabrooks et al. |
| 2017/0160933 A1 | 6/2017 | De Jong et al. |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0188698 A1 | 7/2018 | Dionne et al. |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0196563 A1 | 6/2019 | Lai |
| 2019/0205272 A1* | 7/2019 | Fodor ........... G06F 16/903 |
| 2019/0220300 A1 | 7/2019 | Rosenboom |
| 2019/0265997 A1 | 8/2019 | Merrill et al. |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0044657 A1 | 2/2020 | Pl et al. |
| 2020/0162234 A1 | 5/2020 | Almog et al. |
| 2020/0235905 A1 | 7/2020 | Su et al. |
| 2020/0287557 A1 | 9/2020 | Horovitz et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2021/0006344 A1 | 1/2021 | Chen et al. |
| 2021/0141413 A1 | 5/2021 | Levi et al. |
| 2021/0175991 A1 | 6/2021 | Neugeboren |
| 2021/0218431 A1 | 7/2021 | Narayanan et al. |
| 2021/0243140 A1 | 8/2021 | Levi et al. |
| 2021/0288785 A1 | 9/2021 | Faig et al. |
| 2021/0297151 A1 | 9/2021 | Levi et al. |
| 2021/0297230 A1 | 9/2021 | Dror et al. |
| 2021/0318978 A1 | 10/2021 | Hsung |
| 2021/0328900 A1 | 10/2021 | Sattinger et al. |
| 2021/0392065 A1 | 12/2021 | Sela et al. |
| 2021/0409031 A1 | 12/2021 | Ranganathan et al. |
| 2022/0006606 A1 | 1/2022 | Levi et al. |
| 2022/0021393 A1 | 1/2022 | Ravid et al. |
| 2022/0066978 A1 | 3/2022 | Mishra et al. |
| 2022/0086105 A1 | 3/2022 | Levi et al. |
| 2022/0121691 A1 | 4/2022 | Barathi |
| 2022/0173741 A1 | 6/2022 | Ravid et al. |
| 2022/0191275 A1 | 6/2022 | Levi et al. |
| 2022/0224500 A1 | 7/2022 | Mula et al. |
| 2022/0239549 A1 | 7/2022 | Zhao et al. |
| 2022/0261032 A1 | 8/2022 | Bateni |
| 2022/0342086 A1 | 10/2022 | Yoshida |
| 2022/0352998 A1 | 11/2022 | Levi et al. |
| 2022/0357763 A1 | 11/2022 | Levy et al. |
| 2022/0360423 A1 | 11/2022 | Levi et al. |
| 2022/0385598 A1 | 12/2022 | Pismenny et al. |
| 2022/0416925 A1 | 12/2022 | Levi et al. |
| 2023/0076889 A1 | 3/2023 | Rabinovich et al. |
| 2023/0185600 A1 | 6/2023 | Wasko et al. |
| 2023/0236624 A1 | 7/2023 | Levi et al. |
| 2023/0251899 A1 | 8/2023 | Levi et al. |
| 2023/0361900 A1 | 11/2023 | Levi et al. |
| 2023/0362096 A1 | 11/2023 | Manevich et al. |
| 2023/0367358 A1 | 11/2023 | Manevich et al. |
| 2023/0370305 A1 | 11/2023 | Manevich et al. |
| 2024/0014916 A1 | 1/2024 | Kernen et al. |
| 2024/0031124 A1 | 1/2024 | Levi et al. |
| 2024/0204897 A1 | 6/2024 | Manevich et al. |
| 2025/0055668 A1* | 2/2025 | Manevich ........ H04L 7/10 |

FOREIGN PATENT DOCUMENTS

| EP | 1215559 B1 | 9/2007 |
| EP | 2770678 A1 | 8/2014 |
| JP | 2011091676 A | 5/2011 |
| TW | 498259 B | 8/2002 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 2014138936 A1 | 9/2014 |

OTHER PUBLICATIONS

Weibel et al., "Implementation and Performance of Time Stamping Techniques", 2004 Conference on IEEE 1588, pp. 1-29, Sep. 28, 2004.
Working Draft Project American National Standard T10/1799-D, "Information Technology—SCSI Block Commands—3 (SBC-3)", pp. 1-220, Revision 19, May 29, 2009.
"Infiniband Architecture: Specification vol. 1", pp. 1-1727, Release 1.2.1, Infiniband Trade Association, Nov. 2007.
Mellanox Technologies, "Mellanox ConnectX IB: Dual-Port InfiniBand Adapter Cards with PCI Express 2.0", pp. 1-2, USA, year 2008.
Wikipedia—"Precision Time Protocol", pp. 1-8, Aug. 24, 2019.
IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.
Weibel, H., "High Precision Clock Synchronization according to IEEE 1588 Implementation and Performance Issues", Zurich University of Applied Sciences, pp. 1-9, Jan. 17, 2005.
Lu et al., "A Fast CRC Update Implementation", Computer Engineering Laboratory, Electrical Engineering Department, pp. 113-120, Oct. 8, 2003.
Texas Instruments, "LMK05318 Ultra-Low Jitter Network Synchronizer Clock With Two Frequency Domains," Product Folder, pp. 1-86, Dec. 2018.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
ITU-T recommendation, "G.8273.2/Y.1368.2—Timing characteristics of telecom boundary clocks and telecom time slave clocks", pp. 1-50, Jan. 2017.
ITU-T Standard G.8262/Y.1362, "Timing characteristics of synchronous equipment slave clock", pp. 1-44, Nov. 2018.
IPclock, "IEEE 1588 Primer," ip-clock.com, pp. 1-3, May 1, 2017 (downloaded from https://web.archive.org/web/20170501192647/http://ip-clock.com/IEEE-1588-primer/).
ITU-T Standard G.8261/Y.1361, "Timing and synchronization aspects in packet networks", pp. 1-120, Aug. 2019.
ITU-T Standard G.8264/Y.1364, "Distribution of timing information through packet networks", pp. 1-42, Aug. 2017.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.
Zhang et al., "TI BAW technology enables ultra-low jitter clocks for highspeed networks", White paper, Texas Instruments, pp. 1-11, Feb. 2019.
Skywork Solutions Inc., "PCI Express 3.1 Jitter Requirements", AN562, pp. 1-16, year 2021.

(56)                    References Cited

OTHER PUBLICATIONS

Intel, "Can Altera GX/GT/GZ device high speed transceivers handle Spread Spectrum Clocking (SSC), as required by PCIe or SATA/SAS protocols?", p. 1, Sep. 11, 2012.
"IEEE Standard for Local and Metropolitan Area Networks—Timing and Synchronization for Time-Sensitive Applications," IEEE Std 802.1AS-2020, IEEE Computer Society, pp. 1-421, year 2020.
Wasko et al., U.S. Appl. No. 18/111,916, filed Feb. 21, 2023.
Manevich et al., U.S. Appl. No. 18/349,976, filed Jul. 11, 2023.
Corbett et al., "Spanner: Google's Globally Distributed Database," ACM Transactions on Computer Systems, vol. 31, No. 3, article 8, pp. 1-22, Aug. 2013.
SiTime Corporation, "Sit5377—60 to 220 MHz, ±100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.
PCI-SIG, "PCI Express®—Base Specification—Revision 3.0," pp. 1-860, Nov. 10, 2010.
Manevich et al., U.S. Appl. No. 18/448,936, filed Aug. 13, 2023.
Manevich et al., U.S. Appl. No. 18/420,822, filed Jan. 24, 2024.
U.S. Appl. No. 18/111,916 Office Action dated Jun. 5, 2024.
Obleukhov et al., "Simple Precision Time Protocol at Meta," pp. 1-15, Feb. 7, 2024, as downloaded from https://engineering.fb.com/2024/02/07/production-engineering/simple-precision-time-protocol-sptp-meta/.
Behn, "meinberg-sync / flashptpd," Meinberg Funkuhren GmbH & Co. KG, pp. 1-6, year 2023.
Arnold et al., "Enterprise Profile for the Precision Time Protocol with Mixed Multicast and Unicast Messages," Internet Engineering Task Force (IETF), TicToc Workgroup, Internet Draft, pp. 1-13, Nov. 23, 2023.
Wikipedia, "Network Time Protocol," pp. 1-20, last edited Mar. 31, 2024.
Silicon Laboratories Inc., "Temperature-Compensated Oscillator Example," AN365, Rev. 0.1, pp. 1-8, Nov. 9, 2009.
Sutton et al., "Reinforcement Learning," Chapter 6.6—"Actor-Critic Methods," The MIT Press, e-book, pp. 1-3, Jan. 4, 2005, as downloaded from incompleteideas.net/book/first/ebook/node66.html.
ITU-T Recommendation, "G.8262.1/Y.1362.1—Series G: Transmission Systems and Media, Digital Systems and Networks—Packet over Transport Aspects—Synchronization, Quality and Availability Targets Series Y: Global Information Infrastructure, Internet Protocol Aspects, Next-Generation Networks, Internet of Things and Smart Cities—Timing Characteristics of Enhanced Synchronous Equipment Slave Clock," pp. 1-26, Jan. 2019.
Ex Parte Quayle Office Action for U.S. Appl. No. 18/448,936, issued Dec. 16, 2024.
Non Final Office Action, U.S. Appl. No. 18/420,822, dated Jan. 7, 2026.
List of References cited by the Examiner, U.S. Appl. No. 18/420,822, dated Jan. 7, 2026.

* cited by examiner

ENVIRONMENTAL-BASED PARAMETERS OPTIMIZATION OF CLOCK

FIELD OF THE INVENTION

The present invention relates to computer systems, and in particular, but not exclusively to, clock synchronization.

BACKGROUND

Clock synchronization among network devices is used in many network applications. One application of using a synchronized clock value is for measuring one-way latency from one device to another device. If the clocks are not synchronized the resulting one-way latency measurement will be inaccurate.

Synchronization is typically achieved by syntonization, in which the clock frequency of two devices is aligned, and aligning the phase between the two devices.

For Ethernet, there are two complementary methods to achieve synchronization. One is Synchronous Ethernet (SyncE), which is a physical-layer protocol which achieves syntonization based on the receive/transmit symbol rate. SyncE is an International Telecommunication Union Tele-communication (ITU-T) Standardization Sector standard for computer networking that facilitates the transference of clock signals over the Ethernet physical layer. In particular, SyncE enables clock syntonization inside a network with respect to a master clock.

The other is Precision Time Protocol (PTP), which is a packet-based protocol that may be used with SyncE to align offset (e.g., in Coordinated Universal Time (UTC) format) and phase between two clocks. PTP is used to accurately synchronize clocks throughout a computer network, and is considered to be the de facto standard for this purpose. PTP is an example of a two-way time synchronization protocol. A two-way time synchronization protocol uses time syn-chronization packets which are exchanged in both directions between a clock leader and a clock follower.

A remote clock frequency from a remote clock may be recovered (e.g., using SyncE) or remote time (e.g., using PTP) and compared to the local clock providing an error signal. PTP and Sync-E implementations use feedback sys-tems (e.g., with a loop filter or servo filter) to steer the local clock frequency and time iteratively towards a recovered remote master time and frequency, respectively. The filter filters input noise from the error signal while correcting local oscillator frequency variations. The filter may also deter-mine how fast the error should be corrected. In some cases, the filter not only looks at the current error but also the integral of the error (which provides the cumulative error). The performance of the filter is governed by filter param-eters which are set by the device designer and may deter-mine how noise is filtered and how quickly the clock error is corrected.

SUMMARY

There is provided in accordance with an embodiment of the present disclosure, a device, including clock circuitry including an oscillator to generate a local clock signal having a clock frequency, and a hardware clock to maintain a local clock responsively to the local clock signal, at least one sensor to measure at least one value of at least one environmental parameter, processing circuitry to find at least one value of at least one filter parameter based on the at least one value of the at least one environmental parameter, and a filter to receive an error signal between a remote clock and the local clock, and filter the error signal and generate an adjustment to cause the clock circuitry to adjust the local clock signal or the local clock based on the at least one value of the at least one filter parameter.

Further in accordance with an embodiment of the present disclosure, the device includes clock synchronization cir-cuitry to find the error signal between the remote clock and the local clock.

Still further in accordance with an embodiment of the present disclosure, the device includes a temperature sensor to measure temperature of the oscillator, the processing circuitry being to find the at least one value of the at least one filter parameter based on the temperature.

Additionally in accordance with an embodiment of the present disclosure the processing circuitry is to find the at least one value of the at least one filter parameter based on a change in the temperature.

Moreover, in accordance with an embodiment of the present disclosure the processing circuitry is to find the at least one value of the at least one filter parameter based on a rate of change of the temperature.

Further in accordance with an embodiment of the present disclosure the processing circuitry is to find the at least one value of at least one filter parameter based on the tempera-ture and at least one property of the oscillator.

Still further in accordance with an embodiment of the present disclosure the at least one property of the oscillator includes frequency stability as a function of the temperature.

Additionally in accordance with an embodiment of the present disclosure, the device includes a vibration sensor to measure vibration of the oscillator, the processing circuitry being to find the at least one value of the at least one filter parameter based on the vibration.

Moreover, in accordance with an embodiment of the present disclosure the processing circuitry is to find the at least one value of the at least one filter parameter based on the vibration and at least one property of the oscillator.

Further in accordance with an embodiment of the present disclosure the at least one property of the oscillator includes frequency stability as a function of the vibration.

Still further in accordance with an embodiment of the present disclosure the processing circuitry is to intermit-tently sample the at least one environmental parameter over time yielding multiple sampled values of the at least one environmental parameter, and find updated values of the at least one filter parameter based on the multiple sampled values.

Additionally in accordance with an embodiment of the present disclosure the processing circuitry is to find a cutoff frequency and an update rate of the filter based on the at least one value of the at least one environmental parameter, and compute the at least one value of the at least one filter parameter based on the cutoff frequency and the update rate of the filter.

Moreover, in accordance with an embodiment of the present disclosure the processing circuitry is to perform a table lookup using the at least one value of the at least one environmental parameter to find the cutoff frequency and the update rate.

Further in accordance with an embodiment of the present disclosure the processing circuitry is to predict the cutoff frequency and the update rate from the at least one value of the at least one environmental parameter using a machine learning model while minimizing clock error.

Still further in accordance with an embodiment of the present disclosure the processing circuitry is to predict the cutoff frequency and the update rate from the at least one value of the at least one environmental parameter using reinforcement learning while minimizing clock error.

Additionally in accordance with an embodiment of the present disclosure the processing circuitry is to predict the cutoff frequency and the update rate from the at least one value of the at least one environmental parameter using a Bayesian optimization framework while minimizing clock error.

Moreover, in accordance with an embodiment of the present disclosure the processing circuitry is to perform a table lookup using the at least one value of the at least one environmental parameter to find the at least one value of the at least one filter parameter.

Further in accordance with an embodiment of the present disclosure the processing circuitry is to predict the at least one value of the at least one filter parameter from the at least one value of the at least one environmental parameter using a machine learning model while minimizing clock error.

Still further in accordance with an embodiment of the present disclosure the processing circuitry is to predict the at least one value of the at least one filter parameter from the at least one value of the at least one environmental parameter using reinforcement learning while minimizing clock error.

Additionally in accordance with an embodiment of the present disclosure the processing circuitry is to predict the at least one value of the at least one filter parameter from the at least one value of the at least one environmental parameter using a Bayesian optimization framework while minimizing clock error.

Moreover in accordance with an embodiment of the present disclosure the filter is a PI servo filter and the at least one filter parameter includes PI constants defining a bandwidth of the filter.

There is also provided in accordance with another embodiment of the present disclosure, a method, including generating a local clock signal having a clock frequency, maintaining a local clock responsively to the local clock signal, measuring at least one value of at least one environmental parameter, finding at least one value of at least one filter parameter based on the at least one value of the at least one environmental parameter, receiving an error signal between a remote clock and the local clock, and filtering the error signal and generate an adjustment to cause adjustment of the local clock signal or the local clock based on the at least one value of the at least one filter parameter.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
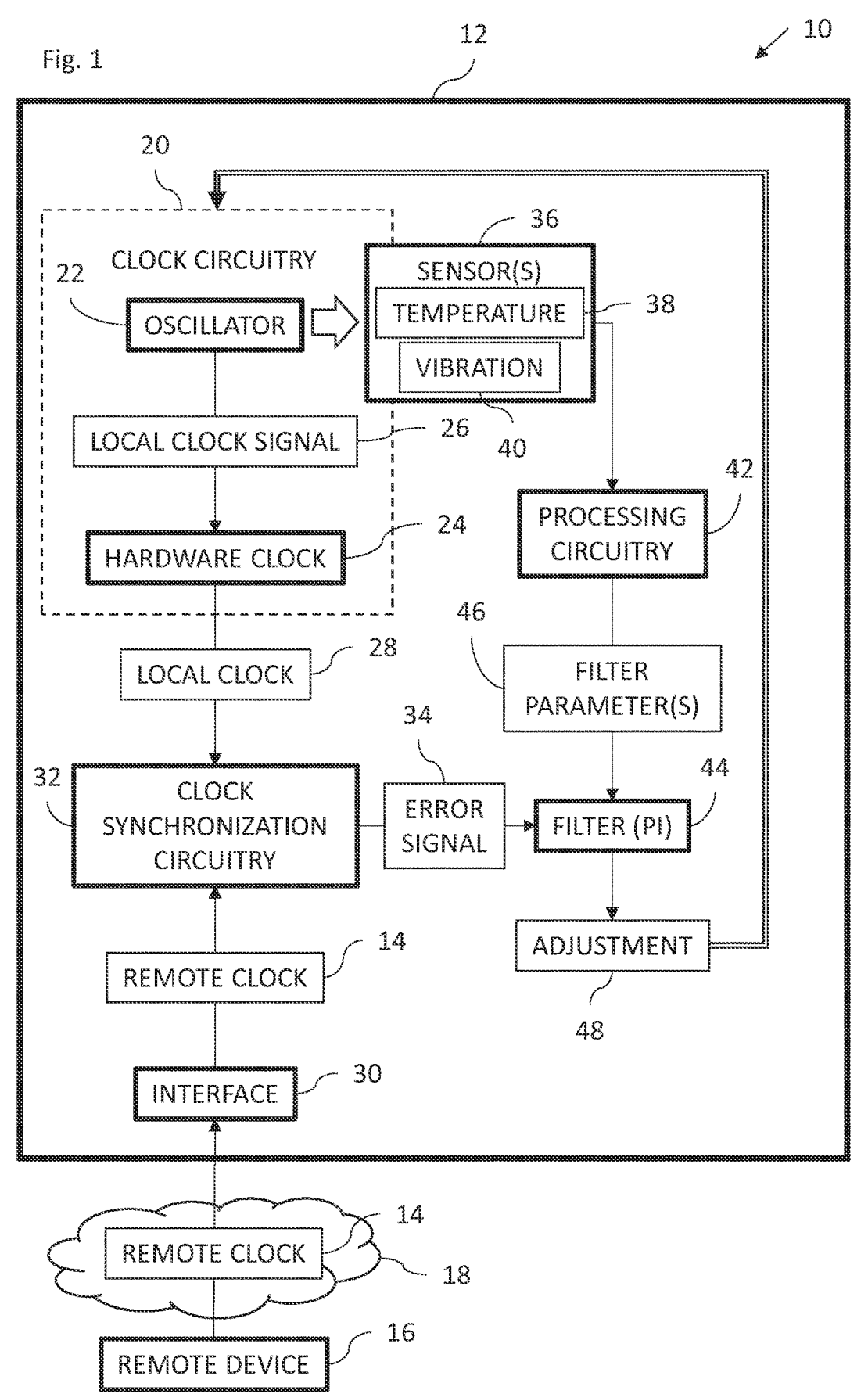
FIG. 1 is a block diagram view of a clock synchronization system constructed and operative in accordance with an embodiment of the present invention.

The local oscillator frequency is sensitive to environmental conditions such as temperature variations and vibration. When the temperature around the oscillator is stable, the oscillator frequency stability is high and the filter should be configured to provide narrow band filtering, allowing better filtering of the input noise. However, when the temperature around the oscillator is unstable, the frequency stability of the oscillator is degraded and the filter should be configured to wide band filtering, allowing the clock synchronization control loop to quickly follow the oscillator frequency changes. Additionally, if the error signal is less noisy, the filter may adjust the clock faster. However, if the error signal is noisier, then it may be desirable to adjust to the remote clock more slowly and rely more on local clock. However, relying on local clock has a trade off as the local clock is generally sensitive to temperature and vibration, for example. For example, the oscillator frequency stability is generally a function of temperature and vibration. Therefore, the filter is unlikely to be set correctly for all the above scenarios and may provide incorrect clock adjustments in many cases.

Therefore, embodiments of the present invention address at least some of the above drawbacks by providing a clock synchronization system in which the value(s) of the filter parameter(s) may be dynamically changed during operation of the system and adjusted based on one or more environmental parameters such as temperature and vibrations. In some embodiments, the value(s) of the filter parameter(s) may be set according to the environmental parameter(s) to minimize the error signal between the remote clock and local clock. In some embodiments, the filter may be a PI servo/filter with parameters P and I defining the filter bandwidth.

One or more temperature sensors and/or vibration sensors may be placed near the oscillator. The sensor(s) may be intermittently sampled to provide metrics such as: temperature, temperature changes, rate of change of temperature, measures of vibration, and changes in vibration, and rate of change of vibration.

The metrics of the environmental parameter(s) may be used along with oscillator properties (e.g., given by the technical specification of the oscillator listing the expected performance of the oscillator based on environmental factors such as temperature and vibration) to adjust the filter characteristics, e.g., cutoff frequency and sampling/update rate of the filter. For example, the system may compute the desired cutoff frequency and update-rate of the filter from the metrics of the environmental parameters (e.g., sampled temperature), and oscillator properties. The value(s) of the filter parameter(s) may then be computed from the computed cutoff frequency and update-rate or directly from the metrics of the environmental parameter(s).

In some embodiments, the value(s) of the filter parameter(s) and/or the cutoff frequency and update-rate may be computed using heuristics (e.g., using a prepopulated table listing rates of change of temperature and corresponding values of the filter parameter(s)). The table may be populated based on prior experimentation by applying different values of the filter parameter(s) for different temperatures and temperature changes and aim to minimize the error signal. In some embodiments, the table may be populated based on artificial intelligence (AI) methods such as Bayesian Optimization (BO), described in disclosed embodiments.

In some embodiments, the values of the filter parameter(s) and/or cutoff frequency and update-rate may be found using reinforcement learning in which exploration may be performed to find the value(s) of the filter parameter(s) that minimize the error signal for given environmental parameter metrics. Once the system is in steady state (e.g., with steady values of the environmental parameters), exploration may be minimized or ceased to allow exploitation with the best value(s) of the filter parameter(s) found during exploration until another change in the environmental parameter(s) is observed.

System Description

Reference is now made to FIG. 1, which is a block diagram view of a clock synchronization system 10 constructed and operative in accordance with an embodiment of the present invention. The clock synchronization system 10 includes a device 12 (e.g., a network device such as a network interface controller or a switch) which is configured to synchronize its clock to a remote clock 14 provided by a remote device 16, e.g., over a network 18, or connected to the device 12 by any suitable connection, such as a data communication interface.

The device 12 includes clock circuitry 20, which includes an oscillator 22 and a hardware clock 24. The oscillator 22 is configured to generate a local clock signal 26 having a clock frequency. In some embodiments, the oscillator 22 may be a digitally controller oscillator (DCO) which is configured to generate a local clock having a local clock frequency. In some embodiments, the DCO may be a "high end" digitally controlled oscillator, such as Temperature Compensated Crystal Oscillator (TCXO) or an Oven Controlled Crystal Oscillator (OCXO). The hardware clock 24 is configured to maintain a local clock 28 (including a clock time advancing with a clock frequency) responsively to the local clock signal 26. The hardware clock 24 may be configured to maintain a time-of-day value advancing at a frequency proportional to a frequency of the local clock signal 26 output by the oscillator 22.

The device 12 also includes an interface 30 (e.g., a network interface) and clock synchronization circuitry 32. The interface 30 is configured to receive the remote clock 14 from the remote device 16. The remote clock 14 may be conveyed according to any suitable time synchronization protocol to synchronize clock frequency and/or clock time. The remote clock 14 may be conveyed using clock synchronization messages sent by the remote device 16 or exchanged between the device 12 and the remote device 16. The remote clock 14 may be conveyed via a data transfer rate between the remote device 16 and the device 12. The clock synchronization circuitry 32 is configured to find an error signal 34 representing the difference in time or frequency between the remote clock 14 and local clock 28).

The device 12 may also include one or more sensors 36 generally disposed in, or adjacent to, the oscillator 22. The sensor(s) 36 may be disposed as close to the oscillator 22 as possible without interfering with the operation of the oscillator 22. In some cases, the sensor(s) 36 may be disposed at some distance from the oscillator 22 as long as the sensor(s) 36 still measures the environmental parameter(s) within the given accuracy needed for the environmental parameter metrics. The sensor(s) 36 may include any suitable sensor(s) configured to measure values of one or more environmental parameters such as temperature and vibration. In some embodiments, the sensor(s) 36 may include one or more temperature sensors 38 to measure temperature of the oscillator 22 and/or one or more vibration sensors 40 to measure vibration of the oscillator 22. The vibration sensor(s) 40 may include one or more accelerometers and/or measure vibration by monitoring the status of one or more fans running on the device 12.

The device 12 also includes processing circuitry 42 and a filter 44. The processing circuitry 42 is configured to find value(s) of one or more filter parameter(s) 46 based on the value(s) of the environmental parameter(s) sensed by the sensor(s) 36. In some embodiments, the processing circuitry 42 is configured to find value(s) of the filter parameter(s) 46 based on the value(s) of the environmental parameter(s) sensed by the sensor(s) 36 and one or more properties of the oscillator 22 (e.g., a response, such as frequency stability, of the oscillator 22 to (changes) in the value(s) of the environmental parameter(s)).

In some embodiments, the processing circuitry 42 is configured to find the value(s) of the filter parameter(s) 46 based on one or more of the following: the temperature value(s) measured by the temperature sensor(s) 38; one or more changes in the value(s) of temperature measured by the temperature sensor(s) 38; one or more rate(s) of change in the value(s) of temperature measured by the temperature sensor(s) 38; and one or more properties of the oscillator 22 (e.g., frequency stability of the oscillator 22 as a function of the temperature or temperature change or rate of change of temperature). The property or properties of the oscillator 22 may be used to generate a lookup table of temperature metrics (e.g., temperature, or change in temperature, or rate of change of temperature with corresponding filter parameter(s) 46) based on the property or properties of the oscillator 22 provided by the manufacturer of the oscillator 22 for example, and/or based on other heuristics described in more detail with reference to FIG. 2.

In some embodiments, the processing circuitry 42 is configured to find the value(s) of the filter parameter(s) 46 based on one or more of the following: value(s) measured by the vibration sensor(s) 40; one or more changes in the value(s) measured by the vibration sensor(s) 40; one or more rate(s) of change in the value(s) measured by the vibration sensor(s) 40; and one or more properties of the oscillator 22 (e.g., frequency stability of the oscillator 22 as a function of the vibration or vibration change or rate of change of vibration). The property or properties of the oscillator 22 may be used to generate a lookup table of vibration metrics (e.g., vibration, or change in vibration, or rate of change of vibration with corresponding filter parameter(s) 46) based on the property or properties of the oscillator 22 provided by the manufacturer of the oscillator 22 for example, and/or based on other heuristics described in more detail with reference to FIG. 2.

In some embodiments, the processing circuitry 42 may find the value(s) of the filter parameter(s) 46 based on a combination of two or more environmental parameters (e.g., temperature and vibration).

The filter 44 is configured to receive the filter parameter(s) 46 found by the processing circuitry 42. The filter 44 is also configured to receive the error signal 34 (between the remote clock 14 and the local clock 28) and filter the error signal 34 and generate an adjustment 48 (e.g., an analogue or a digital signal or one or more commands) to cause the clock circuitry 20 to adjust the local clock signal 26 or the local clock 28 based on the value(s) of the filter parameter(s) 46. Causing the clock circuitry 20 to adjust the local clock signal 26 or the hardware clock 24 may include: the oscillator 22 (e.g., a DCO) changing the frequency of the local clock signal 26 or a digital synthesizer changing the output of the oscillator 22; changing the time value (e.g., counter value) of the hardware clock 24 or conversion parameters used by the hardware clock 24 to convert a counter value maintained by the hardware clock 24 to a time of day value. In some embodiments, the filter 44 is a PI servo filter and the filter parameters 46 includes PI constants defining a bandwidth of the filter 44.

In practice, some or all of the functions of the clock synchronization circuitry 32 and/or the processing circuitry 42 may be combined in a single physical component or, alternatively, implemented using multiple physical components. These physical components may comprise hard-wired or programmable devices, or a combination of the two. In some embodiments, at least some of the functions of the clock synchronization circuitry 32 and/or processing circuitry 42 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
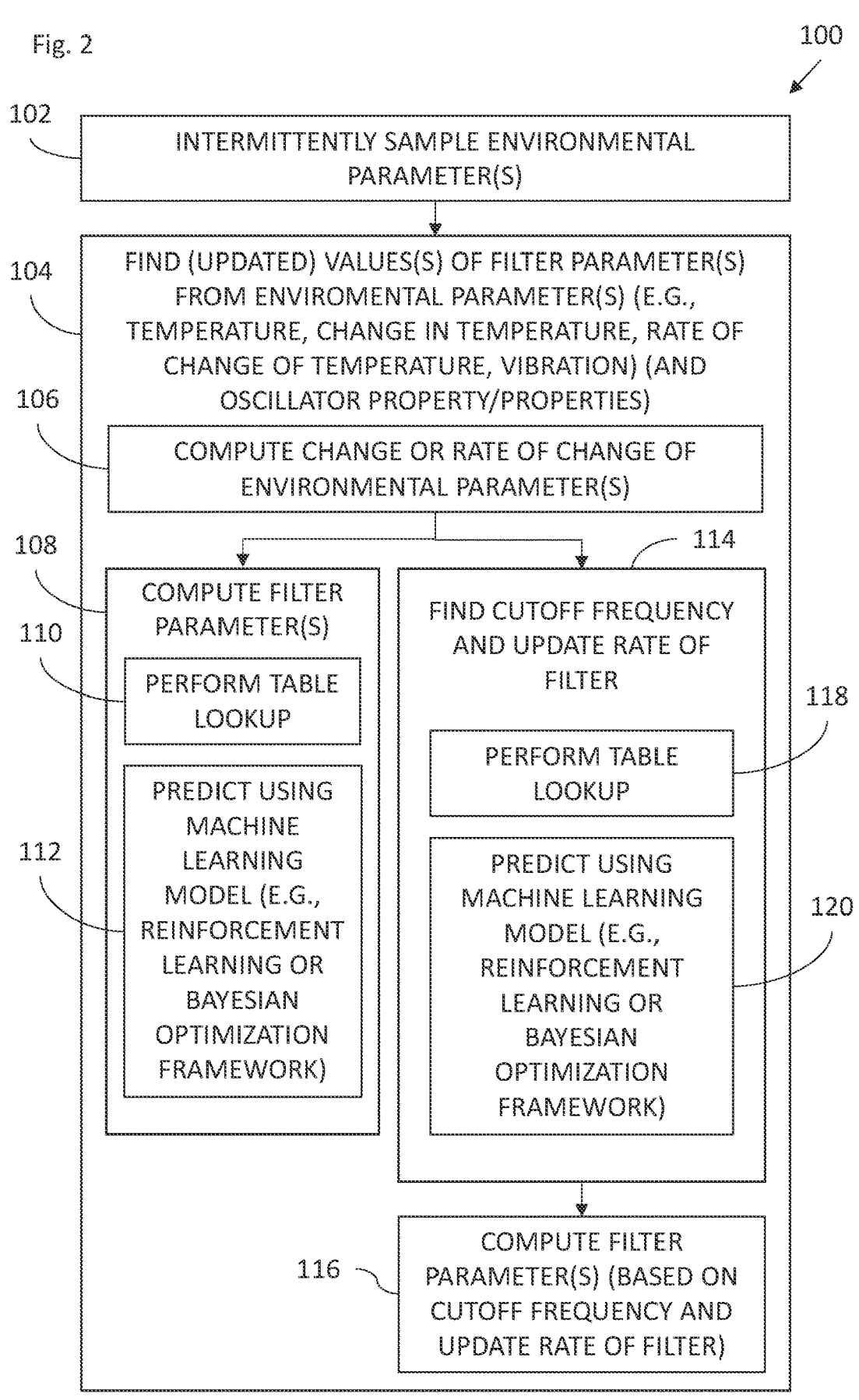
FIG. 2 is a flowchart including steps in a method of operation of the system of FIG. 1.

Reference is now made to FIG. 2, which is a flowchart 100 including steps in a method of operation of the system 10 of FIG. 1. Reference is also made to FIG. 1. The processing circuitry 42 is configured to intermittently sample the environmental parameter(s) by sampling the sensor(s) 36 over time yielding multiple sampled values of the environmental parameter(s) (block 102). The processing circuitry 42 is configured to find updated values of the filter parameter(s) 46 based on the multiple sampled values and optionally based on one or more properties of the oscillator 22 (block 104).

The step of block 104 may include the processing circuitry 42 being configured to compute the change and/or rate of change of the environmental parameter(s) based on the sampled values (block 106).

In some embodiments, the step of block 104 may also include computing the filter parameter(s) 46 based on the sampled values and/or the computed change and/or rate of change of the environment parameters (block 108).

In some embodiments, the step of block 108 includes the processing circuitry 42 being configured to perform a table lookup using the value(s) of the environmental parameter(s) (e.g., sampled values and/or the computed change and/or rate of change of the environment parameters) to find the value(s) of the filter parameter(s) 46 (block 110). The table may be populated based on the given properties of the oscillator 22 as given by the oscillator 22 manufacturer and/or by prior experimentation by applying different values of the filter parameter(s) 46 for different temperatures and/or vibrations and temperature and/or vibration changes and aim to minimize the error signal 34. In some embodiments, the table may be populated based on artificial intelligence (AI) methods such as Bayesian Optimization (BO), described in more detail below.

In some embodiments, the step of block 108 includes the processing circuitry 42 being configured to predict the value(s) of the filter parameter(s) 46 from the value(s) of the environmental parameter(s) (e.g., sampled values and/or the computed change and/or rate of change of the environment parameters) using a machine learning model (block 112) while minimizing clock error. In some embodiments, the processing circuitry 42 is configured to predict the value(s) of the filter parameter(s) 46 from the value(s) of the environmental parameter(s) using reinforcement learning while minimizing clock error, as described in more detail below. In some embodiments, the processing circuitry 42 is configured to predict the value(s) of the filter parameter 46 from the value(s) of the environmental parameter(s) using a Bayesian optimization framework while minimizing clock error, described in more detail below.

In other embodiments, the step of block 104 may also include the processing circuitry 42 being configured to compute a cutoff frequency and an update (or sampling) rate of the filter 44 based on the sampled values and/or the computed change and/or rate of change of the environment parameters (block 114), and then compute the value(s) of the filter parameter(s) 46 based on the computed cutoff frequency and the update rate of the filter 44 (block 116).

In some embodiments, the step of block 114 includes the processing circuitry 42 being configured to perform a table lookup using the value(s) of the environmental parameter(s) (e.g., sampled values and/or the computed change and/or rate of change of the environment parameters) to find the cutoff frequency and the update (or sampling) rate (block 118). The table may be populated based on the given properties of the oscillator 22 as given by the oscillator 22 manufacturer and/or by prior experimentation by applying different values of the cutoff frequency and the update (or sampling) rate for different temperatures and/or vibrations and temperature and/or vibration changes and aim to minimize the error signal 34. In some embodiments, the table may be populated based on artificial intelligence (AI) methods such as Bayesian Optimization (BO), described in more detail below.

In some embodiments, the step of block 114 includes the processing circuitry 42 being configured to predict the cutoff frequency and the update (or sampling) rate from the value(s) of the environmental parameter(s) (e.g., sampled values and/or the computed change and/or rate of change of the environment parameters) using a machine learning model (block 120) while minimizing clock error. In some embodiments, the processing circuitry 42 is configured to predict the cutoff frequency and the update (or sampling) rate from the value(s) of the environmental parameter(s) using reinforcement learning while minimizing clock error, as described in more detail below. In some embodiments, the processing circuitry 42 is configured to predict the cutoff frequency and the update (or sampling) rate from the value(s) of the environmental parameter(s) using a Bayesian optimization framework while minimizing clock error, described in more detail below.

The goal of the optimization process is to find the filter parameter(s) (or the cutoff frequency and the update (or sampling) rate) that minimize the clock error for a given value or values of the environmental parameter(s). Formally, suppose $\in (t|k_p, k_i, T)$ is the error at time t, given filter parameters $k_i$ and $k_p$ and environmental parameter metric T, then the goal is to tune the filter parameter(s) to minimize the minimal mean squared error over a given time interval of length $\tau$, e.g., given by the following cost function:

$$k_i, k_p = \operatorname{argmin} \frac{1}{\tau} \int_0^\tau \left| \epsilon \left( t \,|\, k'_p, k'_i, T \right) \right|^2 dt$$

In general, there are many methods to solve optimization problems, ranging from quasi-Newton methods to genetic algorithms and simulated annealing, to name some. However, not all methods can be applied in practice because of the following reasons: (a) computing the error signal for a given set of parameters may be expensive and very time consuming, (b) the function may be noisy, i.e., computing the function with the same input variables may lead to different values, and (c) the dimension of the problem may be high, depending on the number of parameters being optimized and many optimization methods do not scale well in high dimensions (i.e., "the curse of dimensionality").

In some embodiments, Bayesian optimization (BO) and/or Reinforcement learning (RL) may be applied to solve the optimization problem. While both methods optimize a target function, Bayesian optimization is more suitable for a black-box/offline optimization, and RL is more suitable for online optimization involving sequential decision making and auxiliary observations, which is suitable for online tracking of environmental parameter change.

The BO method optimizes the parameters for different environmental parameters (or changes or rate of changes) in advance (e.g., by building a lookup table for the parameters for each possible environmental parameter metric), and changing the parameters used in the filter 44 according to the lookup table. BO is trained offline by trying different environmental parameter metrics (e.g., vibration or rate of change of temperature etc.), and changing the filter parameter(s) 46 and observing the resulting clock error. The cost function may be used to find the best parameter(s) 46 that provides a minimal cost function.

RL may be used to explore different parameters 46 and perform other observations such as observation of the metrics of the environmental parameter(s) and previous actions in order to find the best policy (e.g., best filter parameter(s) 46). The RL may then exploit with the best policy, e.g., the best parameters 46. Once the best policy is found exploration may stop. Alternatively, some exploration may continue to be performed even after the best policy is found. If the error signal 34 increases above a given limit and/or a change in environmental parameter(s)) above a given limit is detected, exploration may be restarted or increased to search for a new policy (e.g., different best filter parameter(s) 46). An RL based solution may also be trained offline (to give prior knowledge) to learn a reasonable policy and when encountering a new situation, the RL may explore the actions (e.g., changing the filter parameter(s) 46) to update the policy. A reward is given for minimizing the error function (e.g., the error signal 34). A possible algorithm may be an algorithm from the Actor-Critic family, which is applicable to continuous observations and continuous actions. In some embodiments, because RL algorithms combine online exploration by nature, exploration may be limited to situations where a large error signal is detected, and in that case a warning may be provided to a user until the device 12 returns to its typical error levels.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A device, comprising:
  clock circuitry including:
    an oscillator to generate a local clock signal having a clock frequency; and
    a hardware clock to maintain a local clock responsively to the local clock signal;
  at least one sensor to measure at least one value of at least one environmental parameter;

processing circuitry to find at least one value of at least one filter parameter based on the at least one value of the at least one environmental parameter; and
  a filter to:
    receive an error signal between a remote clock and the local clock; and
    filter the error signal and generate an adjustment to cause the clock circuitry to adjust the local clock signal or the local clock based on the at least one value of the at least one filter parameter, wherein the processing circuitry is to: find a cutoff frequency and an update rate of the filter based on the at least one value of the at least one environmental parameter; and compute the at least one value of the at least one filter parameter based on the cutoff frequency and the update rate of the filter.

2. The device according to claim 1, further comprising clock synchronization circuitry to find the error signal between the remote clock and the local clock.

3. The device according to claim 1, further comprising a temperature sensor to measure temperature of the oscillator, the processing circuitry being to find the at least one value of the at least one filter parameter based on the temperature.

4. The device according to claim 3, wherein the processing circuitry is to find the at least one value of the at least one filter parameter based on a change in the temperature.

5. The device according to claim 3, wherein the processing circuitry is to find the at least one value of the at least one filter parameter based on a rate of change of the temperature.

6. The device according to claim 3, wherein the processing circuitry is to find the at least one value of at least one filter parameter based on the temperature and at least one property of the oscillator.

7. The device according to claim 6, wherein the at least one property of the oscillator includes frequency stability as a function of the temperature.

8. The device according to claim 1, further comprising a vibration sensor to measure vibration of the oscillator, the processing circuitry being to find the at least one value of the at least one filter parameter based on the vibration.

9. The device according to claim 8, wherein the processing circuitry is to find the at least one value of the at least one filter parameter based on the vibration and at least one property of the oscillator.

10. The device according to claim 9, wherein the at least one property of the oscillator includes frequency stability as a function of the vibration.

11. The device according to claim 1, wherein the processing circuitry is to:
  intermittently sample the at least one environmental parameter over time yielding multiple sampled values of the at least one environmental parameter; and
  find updated values of the at least one filter parameter based on the multiple sampled values.

12. The device according to claim 1, wherein the processing circuitry is to perform a table lookup using the at least one value of the at least one environmental parameter to find the cutoff frequency and the update rate.

13. The device according to claim 1, wherein the processing circuitry is to predict the cutoff frequency and the update rate from the at least one value of the at least one environmental parameter using a machine learning model while minimizing clock error.

14. The device according to claim 1, wherein the processing circuitry is to predict the cutoff frequency and the update rate from the at least one value of the at least one environmental parameter using reinforcement learning while minimizing clock error.

15. The device according to claim 1, wherein the processing circuitry is to predict the cutoff frequency and the update rate from the at least one value of the at least one environmental parameter using a Bayesian optimization framework while minimizing clock error.

16. The device according to claim 1, wherein the processing circuitry is to perform a table lookup using the at least one value of the at least one environmental parameter to find the at least one value of the at least one filter parameter.

17. The device according to claim 1, wherein the processing circuitry is to predict the at least one value of the at least one filter parameter from the at least one value of the at least one environmental parameter using a machine learning model while minimizing clock error.

18. The device according to claim 1, wherein the processing circuitry is to predict the at least one value of the at least one filter parameter from the at least one value of the at least one environmental parameter using reinforcement learning while minimizing clock error.

19. The device according to claim 1, wherein the processing circuitry is to predict the at least one value of the at least one filter parameter from the at least one value of the at least one environmental parameter using a Bayesian optimization framework while minimizing clock error.

20. A method, comprising:

generating a local clock signal having a clock frequency;

maintaining a local clock responsively to the local clock signal;

measuring at least one value of at least one environmental parameter;

finding at least one value of at least one filter parameter based on the at least one value of the at least one environmental parameter;

receiving an error signal between a remote clock and the local clock; and filtering the error signal and generate an adjustment to cause adjustment of the local clock signal or the local clock based on the at least one value of the at least one filter parameter;

finding a cutoff frequency and an update rate of the filter based on the at least one value of the at least one environmental parameter; and computing the at least one value of the at least one filter parameter based on the cutoff frequency and the update rate of the filter.

21. A device, comprising:

clock circuitry including:

an oscillator to generate a local clock signal having a clock frequency; and a hardware clock to maintain a local clock responsively to the local clock signal;

at least one sensor to measure at least one value of at least one environmental parameter;

processing circuitry to find at least one value of at least one filter parameter based on the at least one value of the at least one environmental parameter; and a filter to:

receive an error signal between a remote clock and the local clock; and filter the error signal and generate an adjustment to cause the clock circuitry to adjust the local clock signal or the local clock based on the at least one value of the at least one filter parameter, wherein the filter is a PI servo filter and the at least one filter parameter includes PI constants defining a bandwidth of the filter.

* * * * *